Patented Feb. 5, 1952

2,584,102

UNITED STATES PATENT OFFICE 2,584,102

SUPPORTED PHOSPHORIC ACID CATALYST
AND ITS PREPARATION

Julian M. Mavity, Hinsdale, Ill., assignor to Universal Oil Products, Chicago, Ill., a corporation of Delaware No Drawing. Application October 17, 1949,
Serial No. 121,907

12 Claims. (Cl. 252—435)

This invention relates to the production of solid catalysts useful in accelerating various types of reactions among organic compounds. In a more specific sense, the invention is concerned with the production of a particular type of solid catalyst which has special properties both in regard to its activity in accelerating and directing olefin polymerization reactions, its stability in service, and in its relatively low corrosive properties when employed in ordinary commercial apparatus comprising various types of steel.

An object of this invention is a method of producing a hydrocarbon conversion catalyst having high catalytic activity.

Another object of this invention is a highly active catalyst suitable for use in the polymerization of olefinic hydrocarbons and in other hydrocarbon conversion reactions involving olefins.

One specific embodiment of this invention relates to a process for improving the catalytic activity of a calcined composite of an acid of phosphorus and a carrier which comprises treating said composite with a volatile halogen compound of phosphorus.

Another embodiment of this invention relates to a process for improving the catalytic activity of a calcined composite of a polyphosphoric acid and a siliceous adsorbent which comprises treating said composite with a volatile halogen compound of phosphorus.

A further embodiment of this invention relates to a process for improving the catalytic activity of a calcined composite of a polyphosphoric acid and diatomaceous earth which comprises treating said composite with phosphorus oxychloride.

The essential and active ingredient of the solid catalysts which are manufactured by the present process for use in organic reactions is an acid of phosphorus, preferably one in which the phosphorus has a valence of 5. The acid may constitute 60% to about 75% or more of the catalyst mixture ultimately produced, and in most cases is over 50% by weight thereof. Of the various acids of phosphorus, orthophosphoric acid ($H_3PO_4$) and pyrophosphoric acid ($H_4P_2O_7$) find general application in the primary mixtures, due mainly to their cheapness and to the readiness with which they may be procured although the invention is not restricted to their use but may employ any of the other acids of phosphorus insofar as they are adaptable. It is not intended to infer, however, that the different acids of phosphorus, which may be employed will produce catalysts which have identical effects upon any given organic reaction as each of the catalysts produced from different acids and by slightly varied procedure will exert its own characteristic action.

In using orthophosphoric acid as a primary ingredient, different concentrations of the aqueous solution may be employed from approximately 75 to 100% or acid containing some free phosphorus pentoxide may even be used. By this is meant that the ortho acid may contain a definite percentage of the pyro acid corresponding to the primary phase of dehydration of the orthophosphoric acid. Within these concentration ranges, the acids will be liquids of varying viscosities, and readily mixed with adsorbent materials. In practice it has been found that pyrophosphoric acid corresponding to the formula $H_4P_2O_7$ can be incorporated with siliceous adsorbents at temperatures somewhat above its melting point (142° F.) and that the period of heating which is given to the pyro acid-adsorbent mixtures or to mixtures of other polyphosphoric acids and siliceous adsorbents may be different from that used when the ortho acid is so employed.

Triphosphoric acid which may be represented by the formula $H_5P_3O_{10}$ may also be used as a starting material for preparation of the catalysts of this invention. These catalytic compositions may also be prepared from the siliceous materials mentioned herein and a phosphoric acid mixture containing orthophosphoric, pyrophosphoric, triphosphoric, and other polyphosphoric acids.

Another acid of phosphorus which may be employed in the manufacture of composite catalysts according to the present invention is tetraphosphoric acid. It has the general formula $H_6P_4O_{13}$ which corresponds to the double oxide formula $3H_2O.2P_2O_5$ which in turn may be considered as the acid resulting when three molecules of water are lost by four molecules of orthophosphoric acid $H_3PO_4$. The tetraphosphoric acid may be manufactured by the gradual and controlled dehydration by heating of orthophosphoric acid or pyrophosphoric acid or by adding phosphorus pentoxide to these acids in proper amounts. When the latter procedure is followed, phosphoric anhydride is added gradually until it amounts to 520% by weight of the total water present. After a considerable period of standing at ordinary temperatures, the crystals of the tetraphosphoric acid separate from the viscous liquid and it is found that these crystals melt at approximately 93° F. and have a specific gravity of 1.1886 at a temperature of 60° F. However, it is unnecessary to crystallize the tetraphosphoric acid before employing it in the preparation of the solid catalysts inasmuch as the crude tetraphosphoric acid mixture may be incorporated with the siliceous adsorbent and other catalyst ingredient.

The materials which may be employed as adsorbents or carriers for acids of phosphorus include siliceous adsorbents such as diatomaceous earth, kieselguhr, artificially prepared silica, and also certain aluminum silicates which include naturally occurring substances as various fuller's earth, clays, such as bentonite, montmorillonite, acid treated clays, also refractory oxides, carbon, and similar materials. Each adsorbent or supporting material which may be used will exert its own specific influence upon the final catalyst composite formed in the process.

Volatile halogen compounds of phosphorus which are employed for treating a calcined composite of a phosphoric acid and a carrier to improve its catalytic activity include particularly volatile chlorine compounds of phosphorus such as phosphorus pentachloride, $PCl_5$; phosphorus oxychloride, $POCl_3$; and phosphorus trichloride, $PCl_3$.

The treatment of a calcined composite of a phosphoric acid and a carrier with a volatile halogen compound of phosphorus may be carried out by one of the following methods:

(1) The calcined composite may be maintained at a temperature of from about 100° to about 550° C. and contacted with vapors of said volatile compound or with a mixture of vapors of a substantially inert solvent and a volatile halogen compound of phosphorus.

(2) The calcined composite of a phosphoric acid and a carrier may also be treated with a solution of volatile halogen compound of phosphorus in a suitable solvent such as a low boiling saturated hydrocarbon, an ether, or another relatively low boiling organic liquid free from hydroxyl groups.

During this treatment of a calcined composite of a phosphorus acid and a carrier with a volatile halogen compound of phosphorus, the amount of said volatile compound is controlled so as to be from about 1 to about 10% by weight of the calcined composite, this amount of the volatile halogen compound of phosphorus and particularly of a volatile chlorine compound of phosphorus being sufficient to increase markedly the catalytic activity of the resultant composite. This treatment of a calcined composite of a phosphoric acid and a carrier with a volatile halogen compound of phosphorus is usually followed by calcination, steaming, or both, the calcination being effected preferably at a temperature of from about 100° to about 550° C.

Composites of a phosphoric acid and a carrier are prepared by mixing the phosphoric acid with the finely divided relatively inert carrier generally at a temperature of from about 20° to about 250° C. to form an aggregate in which the phosphoric acid is ordinarily the major proportion by weight. The resultant aggregate is a slightly moist to almost dry material which upon being compressed becomes sufficiently plastic that it can be extruded and formed into shaped particles. The resultant particles are then dried and calcined at a temperature of from about 100° to about 550° C. for a time of from about 0.25 to about 10 hours to form a substantially solid material. The calcining operation may be carried out by heating the formed particles in a substantially inert gas such as air, nitrogen, flue gas, and the like. These calcined particles are then composited with a volatile halogen compound of phosphorus.

A calcined composite of an acid of phosphorus and a carrier is treated with vapors of a volatile halogen compound of phosphorus as hereinabove set forth or with a mixture of vapors of said compound and a substantially inert solvent. Alternatively, the particles of the calcined composite of a phosphoric acid and a carrier may be mixed with or soaked in a solution of a volatile halogen compound of phosphorus dissolved in a suitable solvent such as a low-boiling saturated hydrocarbon, an ether, or another relatively low-boiling organic liquid free from hydroxyl groups. The treated composites may then be separated from the excess treating solution by decanting or distilling said solution or solvent therefrom after which the catalyst particles wetted with the solution of the volatile halogen compound of phosphorus may be heated in an inert atmosphere to remove excess solvent and also the remainder of the volatile halogen compound of phosphorus to form a solid catalytic material with a structural strength greater than that of the calcined composite of a phosphoric acid and carrier which was subjected to this treating step with the volatile halogen compound of phosphorus.

Calcined composites of a phosphoric acid and a carrier particularly a siliceous carrier, which has been treated as herein set forth with a volatile halogen compound of phosphorus are active for promoting polymerization of olefinic hydrocarbons, particularly for promoting polymerization of normally gaseous olefinic hydrocarbons to form normally liquid hydrocarbons suitable for use as constituents of gasoline. When employed in the conversion of olefinic hydrocarbons into polymers, the calcined catalyst formed as herein set forth, is preferably employed as a granular layer in a heated reactor, which is generally made from steel, and through which the preheated hydrocarbon fraction is directed. Thus the solid catalyst of this process may be employed for treating mixtures of olefin-containing hydrocarbon vapors to effect olefin polymerization, but this same catalyst may also be used at operating conditions, suitable for maintaining liquid phase operation during polymerization of olefinic hydrocarbons, such as butylenes, to produce gasoline fractions. Thus when employed in the polymerization of normally gaseous olefins, the formed and calcined catalyst particles are generally placed in a vertical, cylindrical treating tower and the olefin-containing gas mixture is passed downwardly therethrough at a temperature of from about 350° to about 550° F. and at a pressure of 100 to about 1500 pounds per square inch when dealing with olefin-containing materials such as stabilizer reflux which may contain from approximately 10 to 50% or more of propylene and butylene. When operating on a mixture comprising essentially butanes and butylenes, this catalyst is effective at conditions favoring the maximum utilization of both normal butylenes and isobutylenes which involves mixed polymerization at temperatures of from approximately 250° to about 325° F. and at pressures of from about 500 to about 1500 pounds per square inch.

In utilizing the catalysts of this invention for promoting miscellaneous organic reactions, the catalysts may be employed in essentially the same way as they are used when polymerizing olefins, in case the reactions are essentially vapor phase, and they also may be employed in suspension in liquid phase in various types of equipment.

With suitable modifications in the details of operation, the present type of catalyst may be employed in a large number of organic reactions including polymerization of olefins as already mentioned. Typical cases of reaction in which the present type of catalyst may be used are the alkylation of cyclic compounds with olefins, the cyclic compounds including aromatics, polycyclic compounds, naphthenes, and phenols; condensation reactions such as those occurring between ethers and aromatics, alcohols and aromatics, phenols and aldehydes, etc.; reactions involving the hydrohalogenation of unsaturated organic compounds, isomerization reactions, ester formation by the interaction of carboxylic acids and olefins, and the like. The specific procedure for utilizing the present type of catalysts in miscellaneous organic reactions will be determined by the chemical and physical characteristics and the phase of the reacting constituents.

During use of these catalysts in vapor phase polymerizations and other vapor phase treatments of organic compounds, it is often advisable to add small amounts of moisture to prevent excessive dehydration and subsequent decrease in catalyst activities. In order to substantially prevent loss of water from the catalyst an amount of water or water vapor such as steam is added to the charged olefin-containing gas so as to substantially balance the vapor pressure of the catalyst. This amount of water vapor varies from about 0.1 to about 6% by volume of the organic material charged.

The following example of the preparation of catalysts comprised within the scope of this invention and the results obtained in their use for catalyzing the polymerization of propylene are characteristic, although the exact details set forth in this example are not to be construed as imposing undue limitations upon the generally broad scope of the invention.

Table I shows comparative results obtained in autoclave tests on the polymerization of propylene in the presence of catalysts prepared from pyrophosphoric acid and diatomaceous earth and from calcined composites of pyrophosphoric acid and diatomaceous earth after treatment with 2% by weight of phosphorus oxychloride. These catalyst activity tests were carried out by placing 10 grams of 5 x 5 mm. pellets and 100 grams of a propane-propylene mixture (50–55% propylene content) in a rotatable steel autoclave of 850 cc. capacity which was then rotated at a temperature of 450° F. for two hours. At the end of this time, determinations were made to indicate the percentage conversions of propylene into liquid polymers in the presence of the calcined composite and of the calcined composite which had been treated with phosphorus oxychloride.

TABLE I

*Propylene polymerizing activities and crushing strengths of catalysts formed by treating a calcined composite of polyphosphoric acid and diatomaceous earth with phosphorus oxychloride*

The catalyst used in runs 1 and 2 was prepared by treating a calcined composite of polyphosphoric acid and diatomaceous earth as follows:

92.6 grams of the calcined composite was covered with a solution of 1.85 grams (1.1 cc.) of phosphorus oxychloride in 100 cc. of pentane. The resultant mixture was then heated at a temperature of 150° C. for two hours in a glass lined rotating steel autoclave of 850 cc. of capacity. The mixture was removed from the autoclave, the liquid was decanted and the solid catalyst was dried in an open dish under a heat lamp for 15 minutes. The dried material was then divided into two portions which were calcined as follows:

| Portions | Calcination— | | Av. Bulk Density g/cc. | Crushing strength, lbs. before use |
|---|---|---|---|---|
| | Temp. °F. | Time, Hrs. | | |
| 1 | 680 | 1 | 0.89 | 15.8 |
| 2 | 860 | 1 | 0.87 | 16.1 |

As shown in Table I, an unexpectedly high activity was observed in the case of the catalyst calcined at 680° F., which showed a conversion of 91.0% compared to a 66.5% conversion of propylene with the untreated commercial catalyst (run 3).

I claim as my invention:

1. A process for improving the catalytic activity of a calcined composite of an acid of phosphorus and a solid supporting material which comprises treating said composite with from about 1 to about 10% by weight of a volatile halogen compound of phosphorus selected from the group consisting of phosphorus pentachloride, phosphorus oxychloride and phosphorus trichloride, and further calcining the resultant composite at a temperature of from about 100° to about 550° C. to form a solid catalytic material with greater hydrocarbon conversion activity than that of the original calcined composite of phosphoric acid and carrier.

2. A process for improving the catalytic activity of a calcined composite of an acid of phosphorus and a solid supporting material which comprises treating said composite with from about 1 to about 10% by weight of a volatile halogen compound of phosphorus selected from the group consisting of phosphorus pentachloride, phosphorus oxychloride and phosphorus trichloride, and further calcining the resultant composite at a temperature of from about 100° to about 550° C. for a time of from about 0.25 to about 10 hours to form a solid catalytic material with greater hydrocarbon conversion activity

[Test Conditions: 10 grams catalyst pellets, 100 grams propane-propylene mixtures containing 53.5% propylene maintained for two hours at a temperature of 230° C. in a rotating autoclave of 850 cc. capacity.]

| Run No. | Material added to calcined composite of polyphosphoric acid and diatomaceous earth | Calcination— | | Per Cent Conv. Propylene | Crushing strength, lbs.— | |
|---|---|---|---|---|---|---|
| | | °F. | Hours | | Before Use | After Use |
| 1 | 2% phosphorus oxychloride | 680 | 1 | 91.0 | 15.8 | 7.1 |
| 2 | 2% phosphorus oxychloride | 860 | 1 | 59.2 | 16.1 | 8.5 |
| 3 | None | 680 | 1 | 66.5 | 11.4 | 5.4 |
| 4 | None | 860 | 1 | 48.5 | 16.0 | 9.1 | than that of the original calcined composite of phosphoric acid and carrier.

3. A process for improving the catalytic activity of a calcined composite of an acid of phosphorus and a solid supporting material which comprises treating said composite with from about 1 to about 10% by weight of a volatile halogen compound of phosphorus selected from the group consisting of phosphorus pentachloride, phosphorus oxychloride and phosphorus trichloride, and further calcining the resultant composite at a temperature of from about 100° to about 550° C. for a time of from about 0.25 to about 10 hours to form a solid catalytic material with greater hydrocarbon conversion activity than that of the original calcined composite of phosphoric acid and a siliceous carrier.

4. A process for improving the catalytic activity of a calcined composite of a polyphosphoric acid and diatomaceous earth which comprises treating said composite with from about 1 to about 10% by weight of a volatile halogen compound of phosphorus selected from the group consisting of phosphorus pentachloride, phosphorus oxychloride and phosphorus trichloride, and further calcining the resultant composite at a temperature of from about 100° to about 550° C. for a time of from about 0.25 to about 10 hours to form a solid catalytic material with greater hydrocarbon conversion activity than that of the original calcined composite of a polyphosphoric acid and diatomaceous earth.

5. A process for improving the catalytic activity of a calcined composite of pyrophosphoric acid and diatomaceous earth which comprises treating said composite with from about 1 to about 10% by weight of a volatile halogen compound of phosphorus selected from the group consisting of phosphorus pentachloride, phosphorus oxychloride and phosphorus trichloride, and further calcining the resultant composite at a temperature of from about 100° to about 550° C. for a time of from about 0.25 to about 10 hours to form a solid catalytic material with greater hydrocarbon conversion activity than that of the original calcined composite of pyrophosphoric acid and diatomaceous earth.

6. A process for improving the catalytic activity of a calcined composite of pyrophosphoric acid and diatomaceous earth which comprises treating said composite with from about 1 to about 10% by weight of phosphorus trichloride, and further calcining the resultant composite at a temperature of from about 100° to about 550° C. for a time of from about 0.25 to about 10 hours to form a solid catalytic material with greater hydrocarbon conversion activity than that of the original calcined composite of pyrophosphoric acid and diatomaceous earth.

7. A process for improving the catalytic activity of a calcined composite of pyrophosphoric acid and diatomaceous earth which comprises treating said composite with from about 1 to about 10% by weight of phosphorus oxychloride, and further calcining the resultant composite at a temperature of from about 100° to about 550° C. for a time of from about 0.25 to about 10 hours to form a solid catalytic material with greater hydrocarbon conversion activity than that of the original calcined composite of pyrophosphoric acid and diatomaceous earth.

8. A process for improving the catalytic activity of a calcined composite of pyrophosphoric acid and diatomaceous earth which comprises treating said composite with from about 1 to about 10% by weight of phosphorus pentachloride, and further calcining the resultant composite at a temperature of from about 100° to about 550° C. for a time of from about 0.25 to about 10 hours to form a solid catalytic material with greater hydrocarbon conversion activity than that of the original calcined composite of pyrophosphoric acid and diatomaceous earth.

9. A process for improving the catalytic activity of a calcined composite of an acid of phosphorus and a solid supporting material which comprises treating said composite with from about 1 to about 10% by weight of phosphorus pentachloride and further calcining the resultant composite at a temperature of from about 100° to about 550° C. to form a solid catalytic material with greater hydrocarbon conversion activity than that of the original calcined composite of phosphoric acid and carrier.

10. A process for improving the catalytic activity of a calcined composite of an acid of phosphorus and a solid supporting material which comprises treating said composite with from about 1 to about 10% by weight of phosphorus oxychloride and further calcining the resultant composite at a temperature of from about 100° to about 550° C. to form a solid catalytic material with greater hydrocarbon conversion activity than that of the original calcined composite of phosphoric acid and carrier.

11. A process for improving the catalytic activity of a calcined composite of an acid of phosphorus and a solid supporting material which comprises treating said composite with from about 1 to about 10% by weight of phosphorus trichloride and further calcining the resultant composite at a temperature of from about 100° to about 550° C. to form a solid catalytic material with greater hydrocarbon conversion activity than that of the original calcined composite of phosphoric acid and carrier.

12. A solid catalytic material formed by treating a precalcined composite of a phosphoric acid and a solid supporting material with a volatile halogen compound of phosphorus selected from the group consisting of phosphorus pentachloride, phosphorus oxychloride and phosphorus trichloride, and calcining the thus treated composite at a temperature from about 100° to about 550° C.

JULIAN M. MAVITY.

No references cited.